United States Patent [19]

Szenger

[11] Patent Number: 5,065,525
[45] Date of Patent: Nov. 19, 1991

[54] LENGTH OR ANGLE MEASURING DEVICE

[75] Inventor: Franz Szenger, Königsbronn, Fed. Rep. of Germany

[73] Assignee: Carl-Zeiss-Stiftung, Heidenheim/Brenz, Oberkochen, Fed. Rep. of Germany

[21] Appl. No.: 577,431

[22] Filed: Sep. 4, 1990

[30] Foreign Application Priority Data

Sep. 6, 1989 [DE] Fed. Rep. of Germany ....... 3929629

[51] Int. Cl.$^5$ ............................................. G01B 11/04
[52] U.S. Cl. ........................................ 33/702; 33/704; 33/707
[58] Field of Search ................. 33/701, 702, 704, 706, 33/707, 708, DIG. 19

[56] References Cited

U.S. PATENT DOCUMENTS 4,136,958  1/1979  Nelle ................................. 33/707 X
4,554,741  11/1985 Affa .
4,684,257  8/1987  Hanaoko ........................... 33/707 X

FOREIGN PATENT DOCUMENTS 174451  7/1984  European Pat. Off. .
123895  3/1987  European Pat. Off. .

Primary Examiner—Harry N. Haroian
Attorney, Agent, or Firm—Hopgood, Calimafde, Kalil, Blaustein & Judlowe

[57] ABSTRACT

At least one of the surfaces of the glass or glass-ceramic graduated-scale support (12) of a measuring device is drawn toward a corresponding surface of the guide part (11) by the capillary action of a liquid film (13). The graduated-scale support floats without friction on this liquid film and is secured against floating away laterally by low-friction stops (16–18) which can also be formed of the liquid film itself or suitable shaping of graduated-scale support and of the guide part to which it is mounted. The graduated-scale support advantageously consists of a material having a precisely known small coefficient of thermal expansion, such as quartz glass, or of a material having a negligibly small coefficient of expansion, such as the commercially available glass ceramic material known as Zerodur. By these measures, length or other measurement errors attributable to thermal effects are minimized.

15 Claims, 4 Drawing Sheets

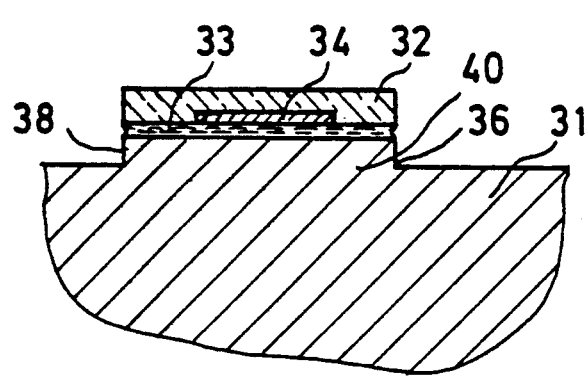
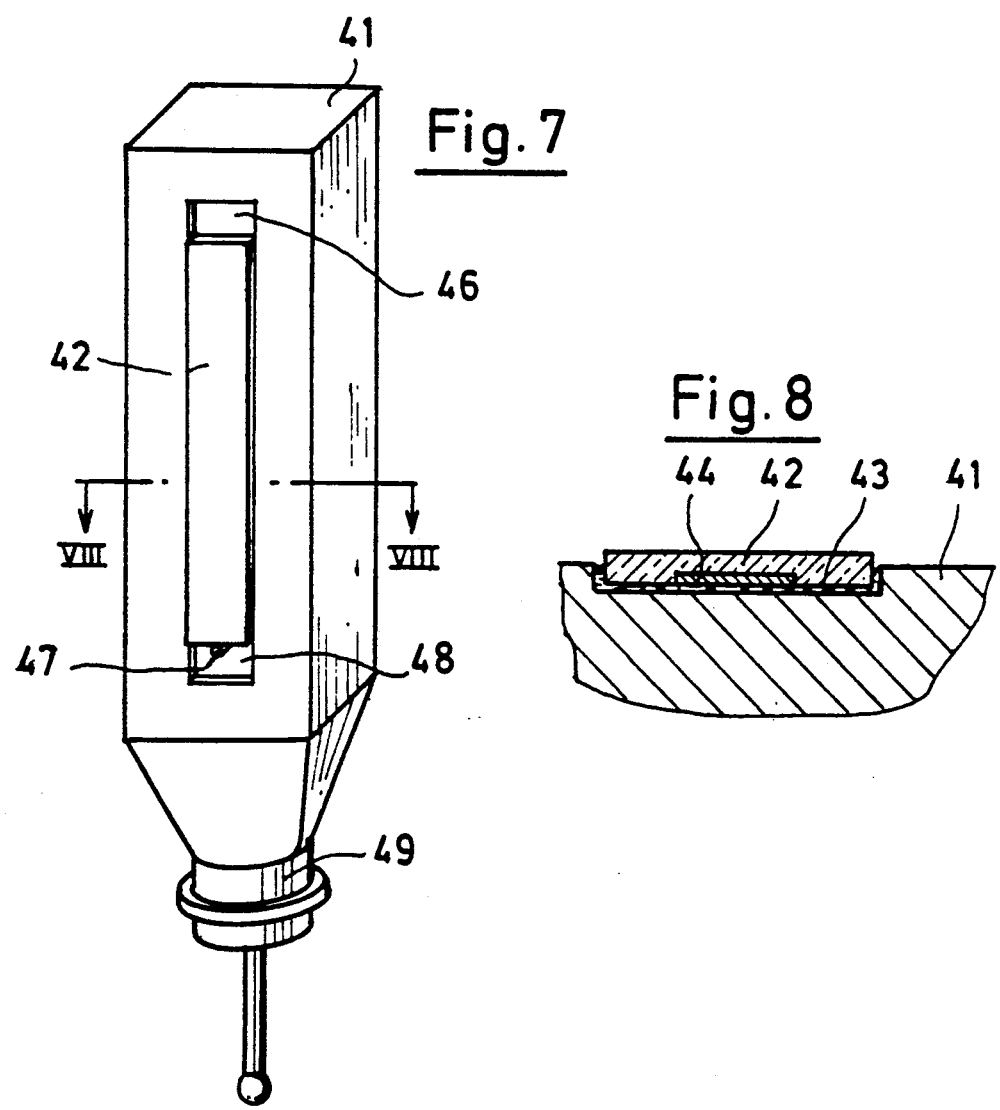

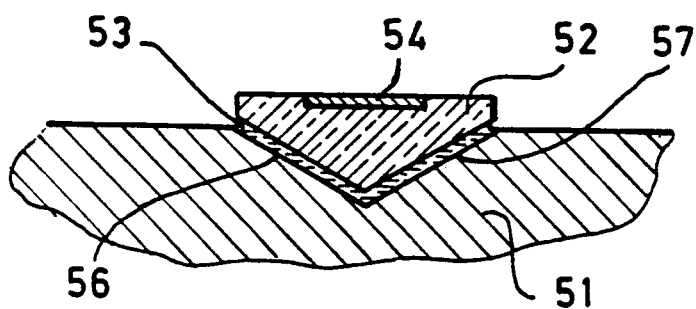
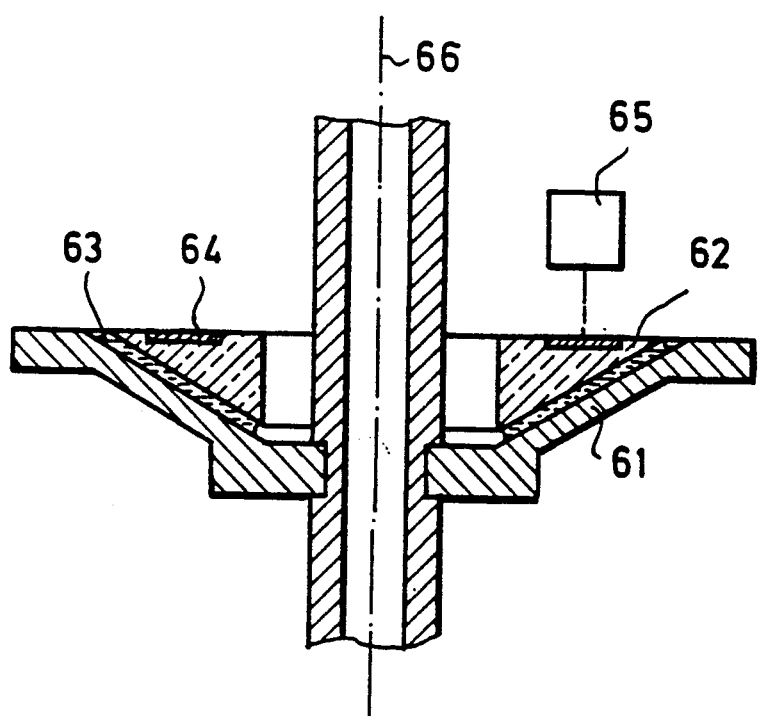

LENGTH OR ANGLE MEASURING DEVICE

BACKGROUND OF THE INVENTION

The present invention relates to a length or angle measuring device having a graduated-scale support which is mounted to a guide part, wherein the guide part has a coefficient of thermal expansion that differs from that of the graduated-scale support.

Illustrative of such graduated-scale supports are the glass scales of photoelectric length-measuring systems. These glass scales are either (i) applied directly to a metal guide part, usually of aluminum, of a given machine, wherein displacement of a carriage is to be measured, or (ii) they are subassembled in a housing which is also of metal, the subassembly being thereafter securely mounted as a unit to the involved guide.

In such measuring systems, measurement errors occur as a result of the different coefficients of thermal expansion between the scale and the mount or guide part, which errors will be explained by way of example in connection with FIGS. 1 and 2 of the accompanying drawings. In FIGS. 1 and 2, a transparent scale 2 is held in the U-shaped groove of an aluminum mounting strip 1 by a plurality of rubber pieces 3 distributed along its length. Static friction between scale 2 and its mount 1, and the unequal coefficients of thermal expansion of the scale and its mount have the result that, in the circumstance of changing ambient temperature, the scale and its mount become twisted in the plane of grid graduations 4 of scale 2, as shown with exaggeration in FIG. 1. The twisting results in stretching and compressing graduations 4 of the scale, and length changes $\Delta L$ of up to 5 $\mu m$ per meter of scale length can occur. In measuring systems, such as those of coordinate-measurement machines, which typically have a resolution of 0.1 $\mu m$, this is clearly not a tolerable change in length.

The indicated length-change effect is particularly disturbing, due to the fact that the scale is not deformed in a reproducible manner but has, rather, a hysteresis behavior due to friction between the scale 2 and its mount 1. It is therefore not feasible to determine the change in length $\Delta L$ of the scale graduations with the aid of an additional temperature measurement on the scale and to correct the measurement result of the length-measuring device accordingly.

Furthermore, the scale 2 can also be deformed in the manner shown in FIG. 2, as a result of temperature gradients which build up in the scale itself, and the poor thermal conductivity of the glass precludes effective compensation for such deformations.

Thermal conditions affect not only scales, as in FIGS. 1 and 2, wherein scale graduations are outside the neutral axis and are therefore stretched and compressed upon flexural deformation; but if temperature gradients occur in the scale, the temperature measured by a temperature sensor may possibly not agree with the average temperature which is to be used for an exact correction of the length of the scale. Furthermore, the coefficient of thermal expansion of the inexpensive grades of glass which are frequently used for scales is not known exactly, in that this coefficient can vary in each case, depending on the batch delivered; thus, for this added reason, any subsequent mathematical correction of the length of the scale is only of limited accuracy.

It has already been proposed in West German OS 3,635,511 (U.S. Pat. No. 4,777,728) to mount a scale, without constrictive force, on rollable balls, whereby to reduce non-reproducible scale deformations that are attributable to friction between the scale and its mount. But with this technique, the scale is very strongly insulated thermally from its mount, so that even larger temperature gradients can build up in the scale itself, and between the scale and its mount. Furthermore, with this type of mounting, it is difficult to maintain a uniform distance between the scale and a scale-reading sensor, since weight of the usually relatively thin scale causes the scale to sag between points of ball support.

West German Patent 2,505,587 (British Patent 1,536,365) describes a length-measuring device wherein a measuring scale of glass is mounted to its metallic carrier via an adhesive layer of silicone rubber. It was found, however, that this type of fastening does not reliably avoid deformation of the scale since the elastic adhesive forces of the adhesive layer may still be impermissibly high, particularly in the case of relatively thin scales.

The point made above, as to use of an adhesive layer of silicone rubber, is also true if the scale is mounted to float on a viscous intermediate layer of asphalt, as proposed in West German Patent 1,176,382. And it is additionally noted that this type of mounting can be used only for a horizontal installation of the scale. Furthermore, European Patent 0,266,498 refers to float-mounting of the scale as being prejudicial.

Still further, said German Patent 1,176,382 describes an embodiment in which, as a result of the surface tension of a layer of liquid present between two webs on the mount, the scale is drawn against said webs. But any contact between the scale and the webs of the mount will give rise to frictional forces which result in the aforementioned disadvantages.

The problems described above also arise in angle-measuring devices that rely on a circle of graduations on a glass scale attached to a metal support.

BRIEF STATEMENT OF THE INVENTION

It is an object of the present invention to create a length or angle-measuring device that is as insensitive as possible to thermal sources of error.

This object is achieved by providing a graduated-scale support which consists of material having a coefficient of thermal expansion that is precisely known or that is negligibly small, and by having at least one of the surfaces of the graduated-scale support drawn toward a corresponding surface of a guide part, by the capillary action of a liquid film, and by retaining the graduated-scale support against rotational or other displacement on the liquid film.

By the combination of these features, thermal influences in the graduated-scale support itself, as well as the locale of scale connection to its mount (or to the guide part with which it is associated) are excluded to the greatest extent possible. Since the graduated-scale support is not bonded at its mount but, rather, floats freely on a liquid film of a thickness of a few $\mu m$, there is no static friction that could lead to unreproducible deformations of the graduated-scale support. At the same time, capillary action draws the graduated-scale support toward its supporting surface with such sufficiently great force that any desired installed orientation, even a suspended mounting on the bottom of a guide, is possible.

Capillary action prevents the liquid from running out of the gap and provides a distributed-area basis of scale-supporting attraction to its mount, so that even very thin scales assume the flatness of the supporting surface of the mount. The distributed-area basis of graduated-scale support on a relatively thin film of liquid assures a good temperature equalization between the graduated-scale support and its mount, thus counteracting the development of temperature gradients.

It is advantageous if the graduated-scale support consists of a material having a precisely known thermal coefficient of expansion of less than $2 \cdot 10^{-6} K^{-1}$. Quartz glass, for example, is one such material. Temperature gradients which may still exist in the scale then no longer appreciably distort it. On the other hand, a mathematical correction for longitudinal thermal expansion of the scale can be performed with precision, since quartz glass is commercially available, having a coefficient of thermal expansion that can be specified with sufficient accuracy.

It is particularly advantageous, however, if the graduated-scale support consists of a glass ceramic having a negligibly small coefficient of thermal expansion, such as, for example, glass-ceramic material sold by Schott Glaswerke of Mainz, West Germany, under the name "Zerodur". One can then dispense with temperature measurement on the scale itself, even when using the measuring scale in high-precision coordinate-measurement instruments over a permissible temperature range of 10K and greater.

The liquid itself, with respect to its physical and chemical properties, should be as stable as possible and physiologically unobjectionable. Silicone oil has proven to be very suitable for this purpose. Furthermore, the kinematic viscosity of the liquid is advantageously within a range of 3,000 mm$^2$/s to 60,000 mm$^2$/s, since with use of more highly viscous liquids, excessive time elapses during the mounting process, while the liquid slowly seeps into the gap between the graduated-scale support and the guide part, and until a complete film is established. On the other hand, if one uses a liquid of too-low viscosity, there is the danger that forces acting on the scale, for example, brief acceleration forces, will dislodge the scale from its supporting surface.

DETAILED DESCRIPTION

Several illustrative embodiments of the invention will be described in detail, in conjunction with the accompanying drawings, in which:

FIG. 6 is a view in section of the scale of a third embodiment;

FIG. 7 is a perspective view of the spindle sleeve of a coordinate-measurement machine provided with a length-measuring device in accordance with the invention;

FIG. 8 is an enlarged fragmentary sectional view, taken in the transverse plane VIII—VIII of FIG. 7;

FIG. 9 is a sectional view of a scale in its mount in accordance with another embodiment of the invention; and FIG. 10 is a sectional view of an angle-measuring device in accordance with the invention.

Figure 1:
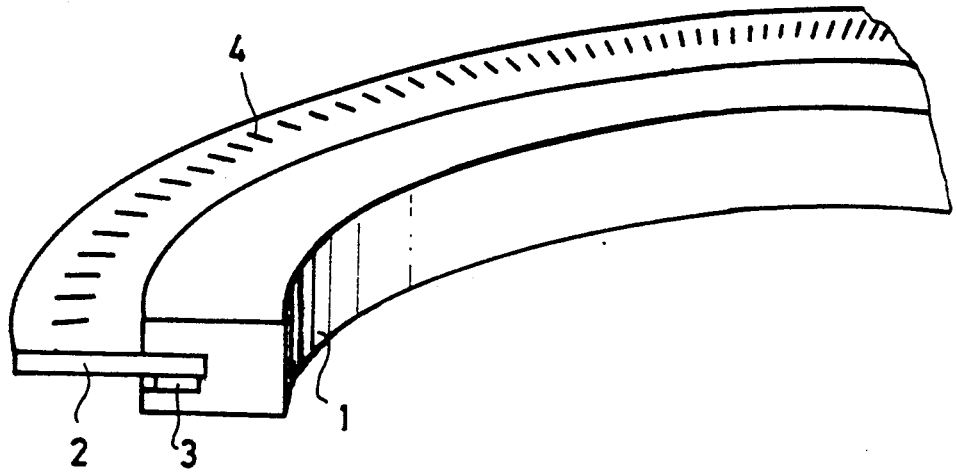
FIG. 1 is a fragmentary perspective view of a scale and holder in accordance with the prior art.
Figure 2:
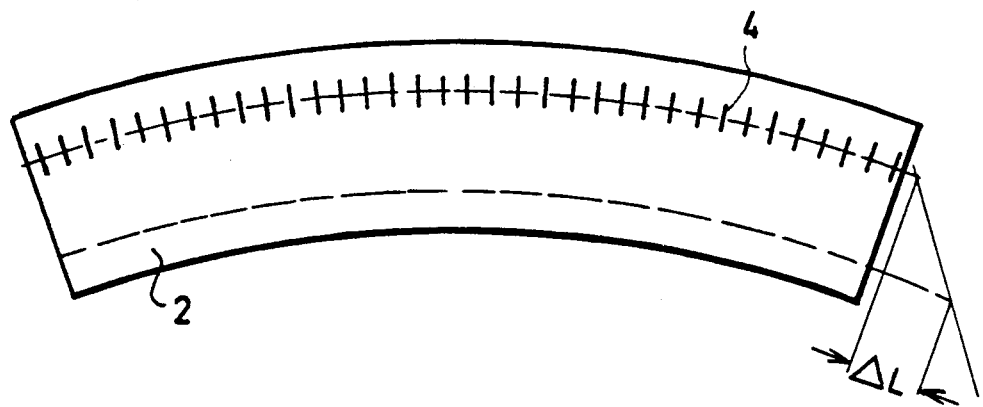
FIG. 2 is a simplified plan view of the scale of FIG. 1.
Figure 3:
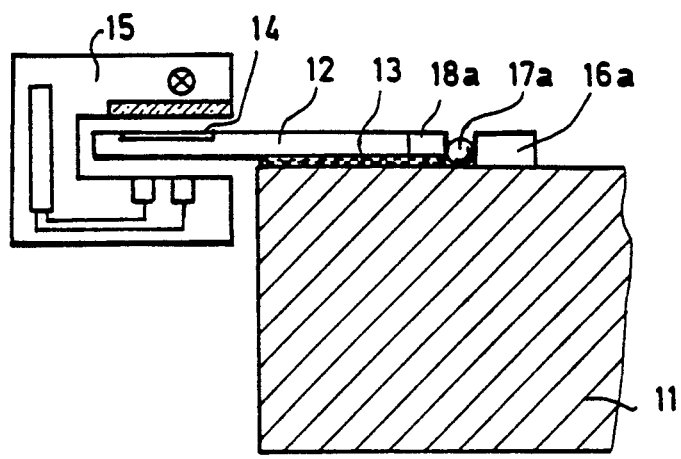
FIG. 3 is a simplified diagram of a first embodiment of a length-measuring system in accordance with the invention, shown in section transverse to the longitudinal axis of the scale.

In FIG. 3, the numeral 11 designates a stationary guide part, which may be the stationary guide part of a coordinate-measuring instrument on which a measurement carriage (not shown) is guided for displacement in the direction perpendicular to the plane of the paper. A photoelectric scale-reading sensor 15 is carried by said measurement carriage.

The guide part 11 mounts a scale 12 for measuring displacement of the carriage.

The scale 12 consists of quartz glass having a differential coefficient of thermal expansion which is precisely known to a value of $\pm 2 \cdot 10^{-8} K^{-1}$. The bottom surface of scale 12 is drawn toward the flat upper side of the guide part 11 by the capillary action of a thin film 13 of liquid. In this connection, the scale protrudes laterally by half of its width, beyond the edge of the guide part. The protruding side of the scale 12 bears a scale graduation 14, such as a ruled incremental grating, which is lapped within the U-shaped cross-section of a sensor 15, and which is scanned by light transmitted from a component of the sensor.

The liquid film 13 suitably consists of silicone oil having a kinematic viscosity of 5,000 mm$^2$/s and a thickness of about 8 μm. Mixtures of dimethyl polysiloxanes of different chain length provide a suitable silicone oil, in which case viscosity can be adjusted by selection of the mixture ratio.

The liquid film 13 is produced by placing scale 12 on the guide part 11 and by then applying the silicone oil to the edge of the guide part, along the length of the scale. The oil then seeps between the underside of the scale 12 and the upper side of the guide part 11 and builds up a closed film the thickness of which is automatically adjusted to a predetermined value.

Figure 4:
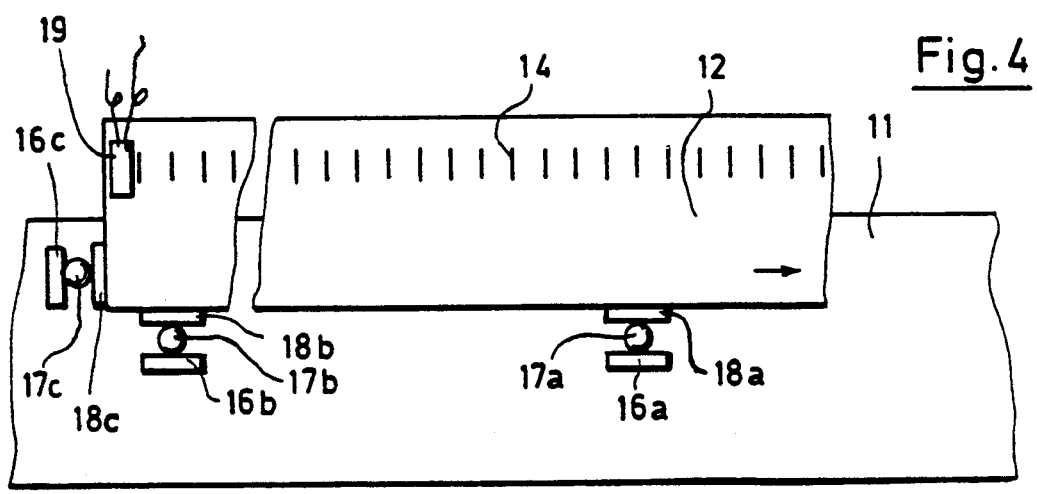
FIG. 4 is a fragmentary plan view of the scale of FIG. 3, together with its mount.

As seen in FIG. 4, three low-friction stops retain scale 12 against rotary or other displacement on the liquid film 13. To this end, steel balls 17a, 17b and 17c engage the flat surfaces of three magnets 16a, 16b and 16c which are secured to guide part 11. And scale 12 engages the balls (17a-c) via small steel plates (19a-c) which are locally bonded to the adjacent edge of scale 12, in the region of the balls. Magnetic forces at each of these three stop locations are slight, but sufficient to draw scale 12 against the stops and to firmly retain the balls in their stopped engagements, without impairing ball-rolling mobility.

Although capillary action enables the liquid film to apply a strong force of attraction, holding scale 12 toward the supporting surface of guide part 11, there is no longitudinal constraining force acting on scale 12 to impair its free accommodation to a different thermal expansion of the guide part 11, with respect to any thermal expansion of scale 12. This is so because so-called Newtonian friction in the liquid film 13 is proportional to the rate of relative longitudinal change, and any thermal expansion of the scale and the guide part is extremely slow.

In addition, a temperature sensor 19 is associated with scale 12 in order to be able to take the longitudinal expansion of the scale material, e.g., quartz, into mathematical consideration.

Figure 5A:
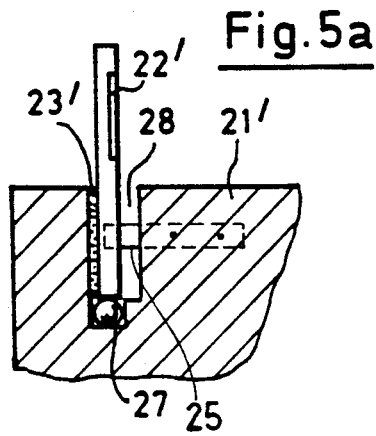
FIG. 5a is a view in section of the scale, together with its mount, for an embodiment that is slightly modified as compared with FIG. 5.
Figure 5:
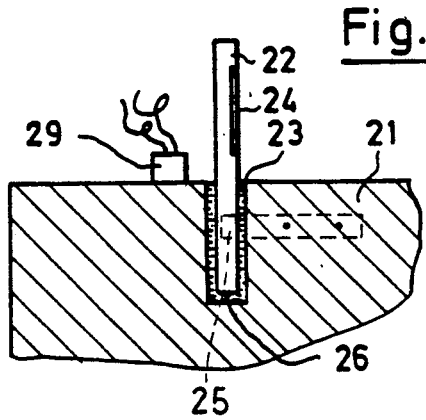
FIG. 5 is a view in section of the scale of a second embodiment, together with its mount.

In the embodiment of FIG. 5, a scale 22 is inserted to stand on its edge in a groove in a guide part 21. In this case, the width of the groove is selected somewhat larger than the thickness of the scale 22 so that capillary gaps on both sides can be filled with liquid film 23. The narrow side edge of the scale 22 also rests on a liquid film. And a spring, suggested by phantom outline at 25, will be understood to continuously apply light longitudinal force to one end of scale 22, urging the same against a stop and in the direction perpendicular to the plane of the drawing.

In the embodiment of FIG. 5, the scale is preferably made of the glass ceramic Zerodur. The coefficient of expansion of this material is negligibly small and is guaranteed by the manufacturer to be $0\pm0.05 \cdot 10^{-6} K^{-1}$, even over a relatively large temperature range; in this circumstance, a temperature sensor on the scale itself is not needed. A temperature sensor 29 on the guide part 2 serves solely to measure longitudinal expansion of the guide part 21.

In the embodiment of FIG. 5, the thickness of the scale 22 must be held to very close tolerance, namely within the thickness of the liquid film 23, to assure against any direct frictional contact of scale 22 with guide part 21. The same close tolerance requirement also exists, as to smoothness of the narrow edge via which scale 22 floats on the bottom of the groove in the guide part. If one does not wish to comply with this tolerance requirement, the vertical mounting of the embodiment of FIG. 5a is recommended. There, the scale 22' is inserted into a groove 28 which is much wider with respect to the thickness of the scale, and capillary action of a liquid film 23' is relied upon to draw one side surface of the scale toward a confronting side surface of the groove. The lower narrow edge of the scale locates on balls, as at 27, which in this case form the low-friction stop.

In the above illustrative embodiments, transparent scales are involved in each case. However, the invention can also be advantageously used in the case of directly illuminated scales. In the embodiment of FIG. 6, the entire bottom-surface area of a directly illuminated scale 32 is supported via a liquid film 33 on an associated guide part 31. In the region of the supporting surface, the guide part 31 has a raised web 40, of width corresponding to that of scale 32. This relationship enables capillary forces of the liquid film 33 to provide the additional function of preventing lateral displacement or distortion of the scale 32. This being the case, provision of separate stops is reduced to only one, in the longitudinal direction of the scale (as at 16c, 17c, 18c, in FIG. 4). And by providing each scale graduation 34 on the underside of the scale, in contact with the liquid film 33, one assures against damage to or soiling of the scale graduations.

What has been said as to FIG. 6 applies also to the directly illuminated scale 42 of the embodiment of FIGS. 7 and 8. Scale 42 is seen to have been inserted, with vertical orientation, in a flat-bottomed groove 46 in the vertical-spindle sleeve 41 of a coordinate-measurement instrument, and to be held in groove 46 by the capillary action of a liquid film 43 between the graduation side of the scale 42 and the bottom of a groove 46. The width of the groove is somewhat larger than that of the scale so that the liquid film 43 can also build along the narrow side edges of the scale 42, thereby securing the latter against lateral or rotational displacement. Scale 42 rests by its own weight on a cylindrical stop 47 on the spindle sleeve 41. The liquid film itself forms the lateral stop for the scale in the embodiment of FIGS. 7 and 8, as in the embodiment of FIG. 5.

Each of the scales thus far described has been of rectangular cross-section. But it will be understood that it is also possible, for example as shown in FIG. 9, to securely support a graduated scale 52 of triangular cross section, by the capillary action of a liquid layer 53. In this case, the scale 52 floats, free of constraining forces, on the surfaces 56, 57 of a groove of V-shaped cross-section in the guide part 51, thus further providing retention against lateral or rotational displacement.

The graduated circular scale of an angle-measuring instrument can also be held without constraining forces, using above-described techniques. Such an embodiment is shown in FIG. 10, wherein a graduated circular scale 62 of wedge-shaped cross-section is drawn concentrically toward the conical mating surface of its metallic support 61 by the capillary action of a liquid layer 63, enabling the scale to float free of friction on this liquid layer. Upon thermal expansion of the support 61, the graduated circle 62 remains concentric to the axis of rotation 66, so that no deflection error can exist to distort the reading of scale graduations 64 by a photoelectric sensor 65.

It will be understood that the graduated circle 62 may be secured against rotational movement relative to its support 61 by a stop (not shown) made of radial grooves in the circle 62 and respective projections on its support 61 for example.

What is claimed is:

1. A length or angle-measuring device having a graduated-scale support which is mounted to a guide part which has a coefficient of thermal expansion that differs from that of the scale support, characterized by the fact that the scale support (12; 22; 32; 42; 62) consists of a material having a precisely known coefficient of thermal expansion, said scale support (i) having at least one surface drawn by the capillary action of a liquid film (13; 23; 33; 43; 63) toward a corresponding surface of the guide part (11; 21; 31; 41; 61), and (ii) has distributed-area support on said liquid film, and means securing the scale support against rotational or other bodily displacement on the liquid film.

2. A length or angle-measuring device having a graduated-scale support which is mounted to a guide part which has a coefficient of thermal expansion that differs from that of the scale support, characterized by the fact that the scale support consists of a material having a precisely known coefficient of thermal expansion, said scale support having a relatively large surface area of overlap with a corresponding surface area of said guide part and being drawn toward the surface area of said guide part essentially only by the capillary action of a liquid film at least coextensive with said overlapping areas, and means securing said scale support against rotational or other bodily displacement of the liquid film.

3. A length or angle-measuring device having a graduated-scale support which is mounted to a guide part which has a coefficient of thermal expansion that differs from that of the scale support, characterized by the fact that the scale support (12; 22; 32; 42; 62) consists of a material having a negligibly small coefficient of thermal expansion, said scale support (i) having at least one surface drawn by the capillary action of a liquid film (13; 23; 33; 43; 63) toward a corresponding surface of the guide part (11; 21; 31; 41; 61), and (ii) has distributed-area support on said liquid film, and means securing the scale support against rotational or other bodily displacement on the liquid film.

4. A length or angle-measuring device having a graduated-scale support which is mounted to a guide part which has a coefficient of thermal expansion that differs from that of the scale support, characterized by the fact that the scale support consists of a material having a negligibly small coefficient of thermal expansion, said scale support having a relatively large surface area of overlap with a corresponding surface area of said guide part nd being drawn toward the surface area of said guide part essentially only by the capillary action of a liquid film at lest coextensive with said overlapping areas, and means securing said scale support against rotational or other bodily displacement on the liquid film.

5. A length or angle-measuring device according to any one of the claims 1, 2, 3 and 4 characterized by the fact that the graduated-scale support (12) consists of material having a precisely known coefficient of thermal expansion of less than $2 \cdot 10^{-6} \, K^{-1}$.

6. A length or angle-measuring device according to any one of claim 1, 2, 3 and 4, characterized by the fact that the graduated-scale support (22) consists of a glass ceramic having a negligibly small coefficient of thermal expansion.

7. A length or angle-measuring device according to any one of claim 1, 2, 3 and 4, characterized by the fact that the graduated-scale support (12; 22) is a transparent scale of a photoelectric length-measuring system, the scale graduations of said support being positioned in laterally offset relation to its mounting to the guide part, and the scale graduations (14; 24) lying outside the natural axis of the scale.

8. A length or angle-measuring device according to any one of claim 1, 2, 3 and 4, characterized by the fact that the graduated-scale support (32; 42) is a scale, illuminated by incident light, of a photoelectric grid-measurement system.

9. A length or angle-measuring device according to any one of claim 1, 2, 3 and 4, characterized by the facts (a) that the graduated-scale support (32; 42) is a scale, illuminated by incident light, of a photoelectric grid-measurement system, and (b) that scale graduations (34; 44) are on the scale-support surface that confronts the liquid film (33; 43).

10. A length or angle-measuring device according to any one of claim 1, 2, 3 and 4, characterized by the fact that at least two surfaces of the graduated-scale support (42; 53) confront the liquid film (43; 53).

11. A length or angle-measuring device according to any one of claim 1, 2, 3, and 4, characterized by the fact that the graduated-scale support (22; 42) is mounted to said guide part with a vertical orientation of its distributed-area support on said liquid film.

12. A length or angle-measuring device according to any one of claim 1, 2, 3 and 4, characterized by the fact that the graduated-scale support is secured by balls (17) against rotary and lineal displacement on the liquid film.

13. A length or angle-measuring device according to any one of claim 1, 2, 3 and 4, characterized by the fact that the graduated-scale support is secured on the guide part (51) against rotary and lineal displacement on the liquid film by at least one limiting-edge formation (36; 38) of the guide part.

14. A length or angle-measuring device according to any one of claim 1, 2, 3 and 4, characterized by the fact that the kinematic viscosity of the liquid is within the range between 3,000 mm$^2$/s and 60,000 mm$^2$/s.

15. A length or angle-measuring device according to any one of claim 1, 2, 3 and 4, characterized by the fact that the liquid (23; 33; 43; 53) is a silicone oil.

* * * * *